R. C. LANPHIER.
MERCURY MOTOR METER.
APPLICATION FILED MAR. 12, 1913.
1,225,975.
Patented May 15, 1917.
3 SHEETS—SHEET 1.
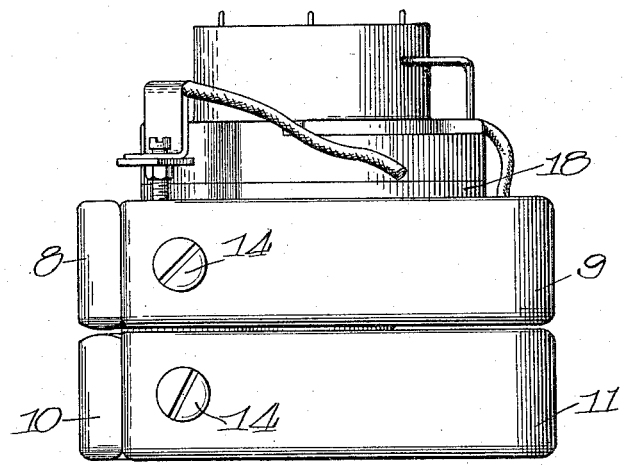
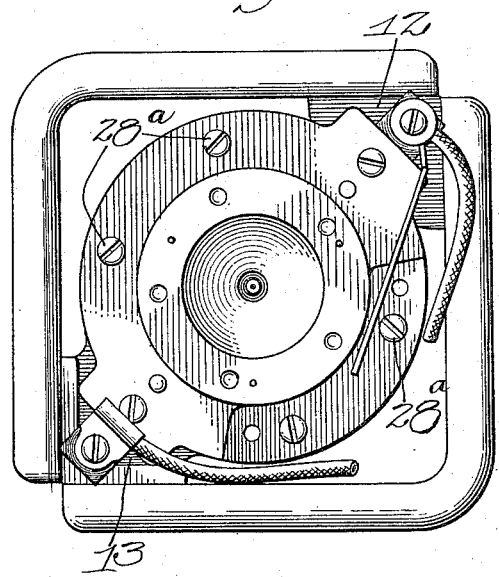

R. C. LANPHIER.
MERCURY MOTOR METER.
APPLICATION FILED MAR. 12, 1913.

1,225,975.

Patented May 15, 1917.
3 SHEETS—SHEET 2.

Witnesses:

Inventor:
Robert C. Lanphier,
by Adams & Jaucum.
Attys.

R. C. LANPHIER.
MERCURY MOTOR METER.
APPLICATION FILED MAR. 12, 1913.

1,225,975.

Patented May 15, 1917.
3 SHEETS—SHEET 3.

UNITED STATES PATENT OFFICE.

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

MERCURY MOTOR-METER.

1,225,975.          Specification of Letters Patent.          Patented May 15, 1917.

Application filed March 12, 1913. Serial No. 753,719.

*To all whom it may concern:*

Be it known that I, ROBERT C. LANPHIER, a citizen of the United States, residing at Springfield, in the county of Sangamon and State of Illinois, have invented certain new and useful Improvements in Mercury Motor-Meters, of which the following is a specification, reference being had to the accompanying drawings.

My invention relates to mercury motor meters and has for its objects to provide a new and improved mercury motor meter in which the auxiliary damping devices heretofore employed are dispensed with and the tendency of the meter to run slow on increasing load is compensated for more efficiently; also to provide improved means for automatically controlling the speed of the meter on charge and on discharge, so that when used in connection with the charge or discharge of storage batteries it will indicate correctly the discharge, while running slow on charge in order to provide for giving a desired amount of overcharge to the battery; or vice versa.

As is well understood by those familiar with the art, a mercury motor meter has a tendency to run slow on increasing load due to the effect of fluid friction of the mercury on the rotating disk or cup immersed in it, and heretofore this has usually been compensated for by means of a retarding or damping member, usually in the form of an aluminum or copper disk rotating in the field of suitable permanent magnets, the retarding effect being caused by the reaction between these magnets and currents created in the rotating metallic disk. By my present invention the use of a separate damping member is avoided, the desired damping or speed control being obtained by devices acting upon the rotating disk of the meter itself, instead of upon an auxiliary disk. I also provide an auxiliary magnet which serves either to accelerate or retard the motor disk, as the case may be, depending on whether it be desired to secure an accurate registration, or a registration which is definitely faster or slower.

As is well understood, in mercury motor meters of the type to which this invention relates, the registering mechanism is operated by the rotation of a metallic disk, which is immersed in mercury contained in a suitable receptacle, the disk rotating in the field of magnets, the poles of which are disposed at diametrically-opposite points adjacent to the disk, an iron plate being arranged at the opposite side of the disk from said poles so that it forms a path for the lines of force. The current is passed through the mercury chamber from one side to the other, and such flow of current through the field of the driving magnet causes the disk to rotate, thereby registering the flow of current by means of the registering mechanism. According to my present invention, instead of using a magnet having north and south poles placed with respect to the line of maximum current flow between contacts leading the current in to and out from the armature or disk, only one main driving pole is employed, and I employ a pair of branched poles of oppositely polarity to the driving pole, which are disposed at opposite ends of a diameter of the armature and equally distant from the main driving pole, so that they are at right angles to the line of current flow through the armature. These branched or split poles produce no torque tending to rotate the armature, as there can be no reaction with the current passing through the armature, and the function of the split poles is, therefore, purely that of damping or controlling the speed of the disk by the effect of the eddy currents that these poles create in the armature or disk as it rotates through their fields. A retarding effect is thus obtained which is exactly the same as if an auxiliary damping disk and magnets outside of the mercury chamber were employed, according to the usual practice.

In order to compensate for the effect of fluid friction and the consequent falling off in accuracy of the meter at increasing load, I provide an auxiliary electro-magnet comprising an auxiliary pole piece of very soft iron which occupies the position opposite the main driving pole that would ordinarily be occupied, according to the former practice, by a main pole piece of opposite polarity to that of the main driving pole. This soft iron auxiliary pole piece is bent so as to provide a path for lines of force created in it, leading to the base of the main driving pole, and also to a certain extent, by leakage, through the split or branched damping pole. The auxiliary soft iron pole is surrounded by a suitable winding, which carries all or a part of the load measured by the meter, i. e., the current which passes through the armature, the result being that for current passing in one direction the auxiliary pole is of opposite polarity to the main driving pole of the permanent magnet and therefore gives an increased driving effect which tends to accelerate the meter on increasing load, thereby increasing its accuracy, so that I have found by test that by this means practically a straight line curve of operation may be obtained. This auxiliary pole piece further operates to slow down the meter on reversal of current, as for example on charging of a battery with which such a meter might be connected, as the auxiliary pole is then of the same polarity as the main driving pole and therefore has a reverse driving effect to that of the main driving pole. I consequently reduce the speed of the meter on increasing load below that which would be normally obtained with a meter of this type not having this compensating pole. The result of the combination of the main and auxiliary pole pieces described, therefore, gives practically a straight line curve of accuracy with current passing through the meter in one direction without the use of an auxiliary damping device, and gives a sloping or falling off curve for reversal of the current.

Referring now to the accompanying drawings,—

Figure 1 is a side elevation of part of a mercury motor meter embodying my improvements, the cover-plate and worm shaft being romoved;

Fig. 2 is a plan view of the parts shown in Fig. 1;

In the accompanying drawings,—

Figure 3:
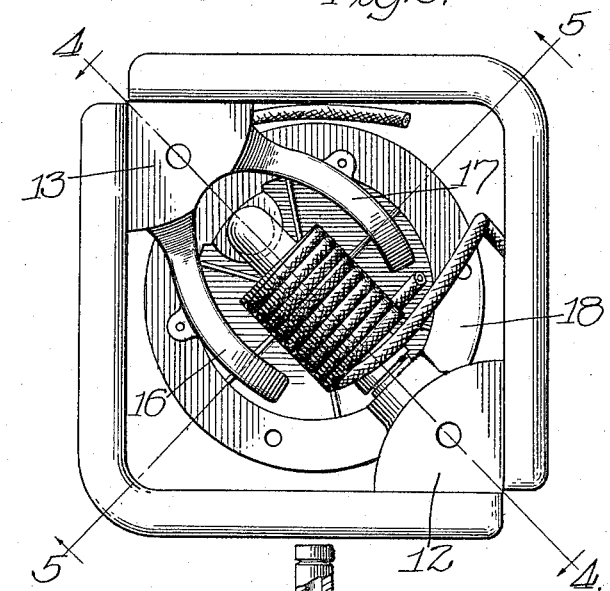
Fig. 3 is a bottom view of the parts shown in Fig. 1.
Figure 4:
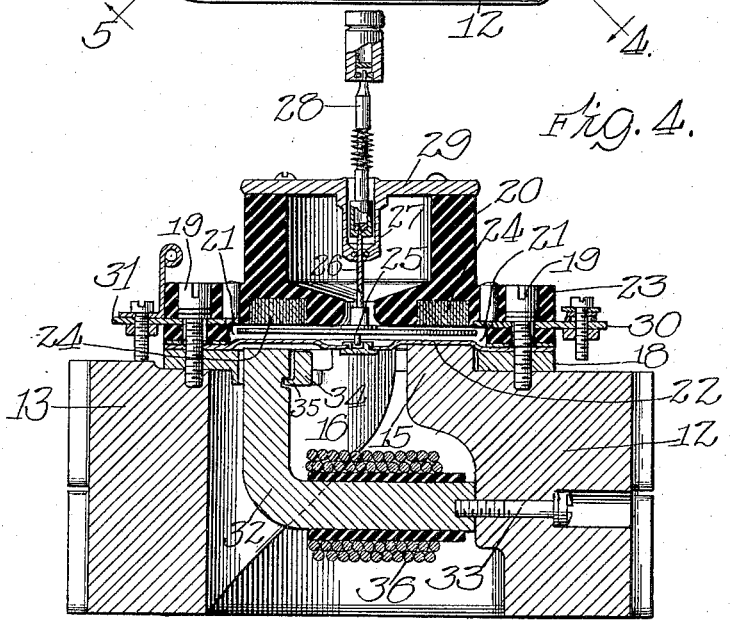
Fig. 4 is a vertical section on line 4—4 of Fig. 3.
Figure 5:
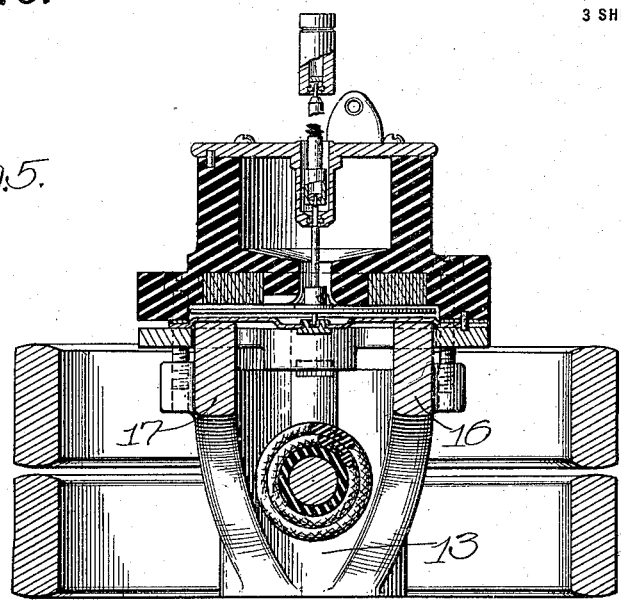
Fig. 5 is a vertical section on line 5—5 of Fig. 3.

8—9—10—11 indicate four steel bars, each bent intermediately at right angles, which are fitted together to form a rectangular frame, being secured at their ends to segmental blocks 12—13, preferably by screws 14, as shown in Figs. 1 and 2. The block 12 is provided with an upwardly and inwardly projecting pole 15, as best shown in Fig. 4, and the block 13 is provided with branched poles 16—17, shown in Figs. 3 and 5, said poles also extending inward and upward, as shown in Figs. 4 and 5. The bars 8—9—10—11 are strongly magnetized, so that the pole 15 is of one polarity and the poles 16—17 of opposite polarity.

18 indicates an annular plate, which is fitted upon the upper surfaces of the blocks 12—13, and is secured by screws 19, as shown in Fig. 4. 20 indicates a cylindrical member of suitable non-conducting material which contains a chamber 21 for the mercury, the chamber being formed by cutting away the central portion of the lower surface of said member and providing a bottom-plate 22, which covers the lower surface of the member 20, including a thick marginal flange 23 with which it is provided. The bottom-plate 22 rests upon the upper surfaces of the poles 15—16—17 and upon the upper surface of the annular plate 18, as shown in Fig. 4. The screws 19 serve to secure the member 20 to the blocks 12—13. 24 indicates a laminated metal ring or return plate which is embedded in the member 20, above the chamber 21, being concentrically disposed with reference to the axis of the cylinder 20, as shown in Fig. 4. 25 indicates a rotating disk or armature which is arranged in the chamber 21 so as to rotate through the mercury therein. Said disk has a spindle 26, which rises through a suitable bearing 27, and connects with a worm shaft 28, by which the registering train of the meter is operated in the usual way. It will be understood that the bottom-plate 22 is removably secured to the member 20 by screws 28ª, or other suitable means, so that access may readily be had to the mercury chamber (see Fig. 2). 29 indicates a cover-plate for the chamber 20, which plate carries the bearing 27. 30—31 indicate terminals embedded in the flange 23 of the member 20 at diametrically-opposite points and communicating with the mercury chamber, said terminals forming the means of connecting the mercury chamber with the wires for conducting the current through the meter. The construction of the member 20 and the parts carried by it separately form no part of my present invention and such parts may be of any approved design. (See Patent No. 911,020 to Lanphier and White dated January 26, 1909.)

As best shown in Figs. 4 and 5, the pole pieces 15—16 and 17 bear against the under surface of the bottom-plate 22, and are triangularly disposed, the split poles 16—17, being along a diameter of the armature which is at right angles to the line of current flow through it from one of the terminals 30—31 to the other so that they are equally distant from the main driving pole 15. The split poles, therefore, produce no driving or torque effect upon the armature, for the reasons hereinbefore given, the pole piece 15 alone providing such torque producing effect. The split poles 16—17, however, do have a damping effect, owing to the influence of the eddy currents created by them in the armature as it rotates through their fields; thus the rotation of the armature is directly controlled by the main driving pole and the split damping poles, without the use of an auxiliary damping disk such as has heretofore been found necessary.

Figure 6:
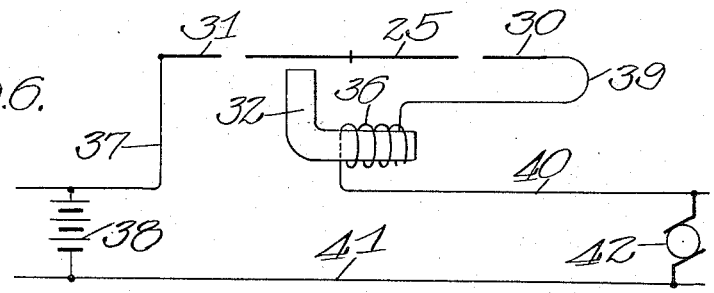
Fig. 6 is a diagrammatic view illustrating the course of the current through the meter and around the auxiliary pole.

The electro-magnet pole piece hereinbefore referred to is best shown at 32 in Fig. 4. As therein shown, said pole comprises a rod of soft iron bent at right angles and secured at one end by a screw 33 to the block 12 which carries the main driving pole 15. The pole piece 32 extends between the branched poles 16—17 and its turned-up end is secured adjacent to the block 13 by a retaining lug 34 having an opening into which it fits. In the construction illustrated the lug 34 has a lip 35 adapted to enter a notch at one side of the pole piece to hold the pole piece in position. The opening in the lug 34 is slightly greater in diameter than the pole piece so that by loosening the screw 33 the pole piece may be moved sufficiently to disengage it from the lip 35 to permit of the removal of the pole piece 32. It will be noted that the upper end of the pole piece 32 lies in close proximity to the bottom-plate 22, and is opposite a part of the return-plate 24. 36 indicates a helix or coil of wire which surrounds a portion of the pole piece 32, said coil being in series with the current which passes through the meter, as best shown in the diagram Fig. 6. As illustrated in said diagram, 37 indicates a wire leading from the pole piece 31 to the battery 38. 39 indicates a wire leading from the opposite pole piece 30 to the helix 36. 40 indicates a load wire leading from the opposite end of said helix, and 41 indicates another load wire connected to the opposite pole of the battery 38. 42 indicates diagrammatically the load on discharge of the battery, or the charging source when charging the battery.

Figure 7:
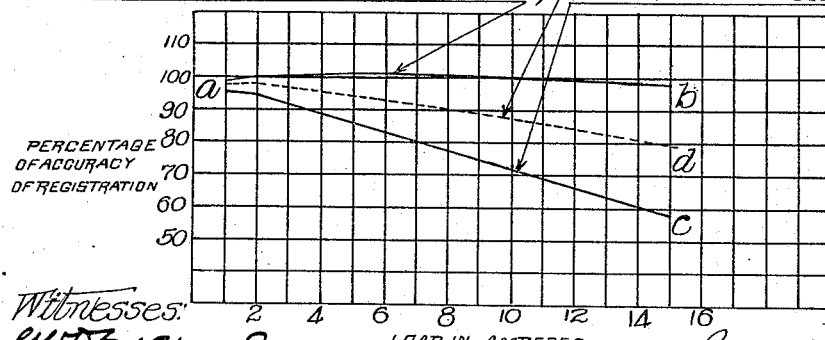
Fig. 7 is a chart showing the curve of operation of the meter under different conditions.

It will be observed that the soft iron pole piece 32 forms a path for lines of force created in it to the base of the main driving pole 15, and also to a certain extent, by leakage, through the split or branched damping poles 16—17. It will also be observed that the winding 36 of the pole piece 32 carries all the current which passes through the armature and is measured by the meter. The battery is connected so that when it is discharging the polarity of the auxiliary pole is opposite to that of the main driving pole 15, so that said poles then coöperate in rotating the armature, thereby giving an increased driving effect which tends to compensate for the fluid friction of the mercury and consequently brings up the accuracy of the meter on increasing load. This is graphically shown in the chart Fig. 7 in which the line $a$—$b$ indicates the curve of operation on discharge of the storage battery where the auxiliary pole is employed, the figures at the bottom of the chart showing the load in amperes, while the figures at the left-hand margin of the chart indicate the percentage of accuracy of registration. On charging the battery the current flows in a reverse direction through the coil 36, thereby reversing the polarity of the auxiliary pole piece so that it has a reverse driving effect to that of the main driving pole 15 and tends to counteract the influence of said pole, thereby reducing the speed of the armature on increasing load below that which it would normally have if the auxiliary pole piece were not used, thus providing for giving to the battery the desired overcharge. In the chart shown in Fig. 7, the line $a$—$c$ indicates the curve of operation of the meter on charge. I have also illustrated by a dotted line $a$—$d$ a curve of operation representing the performance of the meter if the auxiliary pole piece were not used.

I thus provide a meter which is very accurate with the current passing through it in one direction, and may be made to run slow with the current flowing in the opposite direction, and which is, therefore, peculiarly efficient for use in connection with storage batteries, as on motor vehicles, and in other similar situations.

While I have shown the main driving pole and the branched damping poles in the form of permanent magnets, it will be understood that the same principle may be employed with meters having fields energized by a potential or other winding. In other respects also my invention is not restricted to the specific embodiment thereof illustrated in the accompanying drawings and hereinbefore described, as it is generic in character, and the claims hereinafter made are, therefore, to be construed accordingly. Instead of mercury, any equivalent therefor may be used.

That which I claim as my invention, and desire to secure by Letters Patent, is,—

1. An electricity meter, comprising a casing having a mercury chamber through which the current to be measured flows, an armature adapted to rotate in the mercury in said chamber, a magnet having a main driving pole, for causing the armature to rotate, and a pair of magnet poles of opposite polarity to that of the main driving pole and disposed at diametrically opposite sides of the armature and at right angles to the line of maximum current flow therethrough, all of said magnet poles being adjacent to the same surface of said armature.

2. An electricity meter, comprising a casing having a mercury chamber through which the current to be measured flows, an armature adapted to rotate in the mercury in said chamber, a magnet having a main driving pole, for causing the armature to rotate, and branched magnet poles of opposite polarity to that of the main driving pole and disposed at diametrically opposite sides of the armature and at right angles to the line of maximum current flow therethrough, all of said magnet poles being adjacent to the same surface of said armature.

3. An electricity meter, comprising a casing having a mercury chamber through which the current to be measured flows, an armature adapted to rotate in the mercury in said chamber, a magnet having a main driving pole, for causing the armature to rotate, a pair of magnet poles of opposite polarity to that of the main driving pole and disposed at diametrically opposite sides of the armature and at right angles to the line of maximum current flow therethrough, all of said magnet poles being adjacent to the same surface of said armature, and means adjacent to the opposite surface of said armature for providing a path for the lines of force.

4. An electricity meter, comprising a casing having a mercury chamber through which the current to be measured flows, an armature adapted to rotate in the mercury in said chamber, a magnet having a main driving pole, for causing the armature to rotate, a pair of magnet poles of opposite polarity to that of the main driving pole and disposed at diametrically opposite sides of the armature and at right angles to the line of maximum current flow therethrough, and a soft iron pole-piece disposed at the diametrically opposite side of the armature from said main driving pole and connected with the latter, said soft iron pole-piece having a winding through which more or less of the current measured by the meter flows in one direction or the other, depending on the direction of flow of current through the armature.

5. An electricity meter, comprising a casing having a mercury chamber through which the current to be measured flows, an armature adapted to rotate in the mercury in said chamber, a magnet comprising a substantially continuous frame disposed in a plane parallel with the mercury chamber and supporting the same, said frame having a main driving pole arranged in proximity to the lower surface of the armature for causing the same to rotate, said frame also having a pair of magnet poles of opposite polarity to that of the main driving pole and disposed at diametrically opposite sides of the armature and at right angles to the line of maximum current flow therethrough, all of said magnet poles being adjacent to the same surface of said armature.

6. An electricity meter, comprising a casing having a mercury chamber through which the current to be measured flows, an armature adapted to rotate in the mercury in said chamber, a magnet comprising a substantially continuous frame disposed in a plane parallel with the mercury chamber and supporting the same, said frame having a main driving pole arranged in proximity to the lower surface of the armature for causing the same to rotate, said frame also having a pair of magnet poles of opposite polarity to that of the main driving pole and disposed at diametrically opposite sides of the armature and at right angles to the line of maximum current flow therethrough, and means adjacent to the upper surface of the armature providing a path for the lines of force.

7. An electricity meter, comprising a casing having a mercury chamber through which the current to be measured flows, an armature adapted to rotate in the mercury in said chamber, a magnet comprising a substantially continuous frame disposed in a plane parallel with the mercury chamber and supporting the same, said frame having a main driving pole arranged in proximity to the lower surface of the armature for causing the same to rotate, said frame also having a pair of magnet poles of opposite polarity to that of the main driving pole and disposed at diametrically opposite sides of the armature and at right angles to the line of maximum current flow therethrough, and a soft iron pole-piece secured to said frame and projecting in proximity to the under surface of the armature at a point diametrically opposite the position of said main driving pole, said soft iron pole-piece having a winding through which more or less of the current measured by the meter flows in one direction or the other, depending on the direction of flow of current through the armature.

8. The combination with a suitable container, mercury in said container, terminals connecting with the mercury at diametrically opposite points, and an armature mounted to rotate in the mercury, of a main driving magnet having a pole adjacent to and acting upon the armature along the line of current flow, and separated magnet poles of opposite polarity to the main driving pole arranged adjacent to the armature at opposite sides of the line of current flow between said terminals and producing no torque tending to rotate the armature, all of said poles being adjacent to the same surface of said armature.

9. The combination with a suitable container, mercury in said container, terminals connecting with the mercury at diametrically opposite points, and an armature arranged to rotate in the mercury, of a magnet having a main driving pole adjacent to and acting upon the armature along the line of current flow, and a branched pole of opposite polarity to that of the main driving pole, the branches of said branched pole being at opposite sides of the line of current flow between said terminals, all of said poles being adjacent to the same surface of said armature.

10. A mercury motor meter comprising a suitable container, mercury in said container, an armature adapted to rotate in the mercury, a magnet having a main driving pole, and auxiliary electro-magnetic means adapted to coöperate with said main driving pole to rotate the armature, or to operate in opposition to said main driving pole to retard the armature, depending on the direction of flow of current through said electro-magnetic means.

11. A mercury motor meter comprising a suitable container, mercury in said container, an armature adapted to rotate in the mercury, a magnet having a main driving pole, auxiliary electro-magnetic means connected with the base of the main driving pole and adapted to coöperate with said main driving pole to rotate the armature, or to operate in opposition to said main driving pole to retard the armature, depending on the direction of flow of current through said electro-magnetic means, and damping means operating on said armature to retard the rotation thereof.

12. A mercury motor meter comprising a suitable container, mercury in said container, an armature adapted to rotate in the mercury, a magnet having a main driving pole and a branched damping pole, and an auxiliary electro-magnet having a winding carrying current proportional with that flowing through the armature, said electro-magnet lying between the branches of the damping pole and being attached to the base of the main driving pole.

13. The combination with a suitable container, mercury in said container, terminals connecting with the mercury at diametrically opposite points, an armature adapted to rotate in the mercury, of a permanent magnet having a main driving magnet pole for rotating said armature, and an auxiliary electro-magnetic pole having a winding carrying current proportional with and flowing in the same direction as that flowing through the armature, said electro-magnetic pole being arranged adjacent to the armature at a point diametrically opposite the main driving pole and being attached to the base of said pole.

14. The combination with a suitable container, mercury in said container, terminals connecting with the mercury at diametrically opposite points, an armature adapted to rotate in the mercury, of a magnet having a main driving pole, and auxiliary electro-magnetic means arranged to coöperate with said main driving pole to rotate the armature, or to operate in opposition to said main driving pole to retard the armature, depending on the direction of flow of current through said electro-magnetic means.

15. The combination with a suitable container, mercury in said container, terminals connecting with the mercury at diametrically opposite points, an armature adapted to rotate in the mercury, of a magnet having a main driving pole, auxiliary electro-magnetic means arranged to coöperate with said main driving pole to rotate the armature, or to operate in opposition to said main driving pole to retard the armature, depending on the direction of flow of current through said electro-magnetic means, and damping means acting upon said armature and arranged at the same side thereof as said main driving pole.

16. The combination with a suitable container, mercury in said container, terminals connecting with the mercury at diametrically opposite points, an armature adapted to rotate in the mercury, of a magnet having a main driving pole and damping poles arranged to act on said armature, and auxiliary electro-magnetic means adapted to coöperate with said main driving pole to rotate the armature, or to operate in opposition to said main driving pole to retard the armature, depending on the direction of flow of current through said electro-magnetic means.

ROBERT C. LANPHIER.

Witnesses:
  CHAS. G. LANPHIER,
  J. N. SCHIMERZ.

Copies of this patent may be obtained for five cents each, by addressing the "Commissioner of Patents, Washington, D. C."